Figure 1:
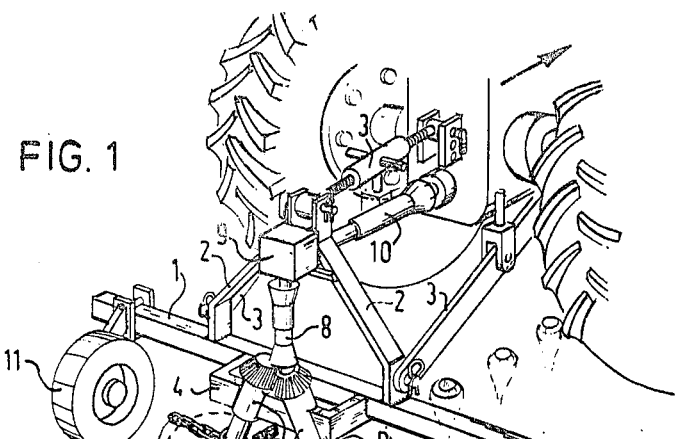

United States Patent [19]

Steketee

[11] 4,232,743
[45] Nov. 11, 1980

[54] DEVICE FOR DIGGING UP TUBEROUS PLANTS, FOR EXAMPLE, BEETS

[75] Inventor: Cornelis J. Steketee, Driewegen, Netherlands

[73] Assignee: Vandenende B.V., Borssele, Netherlands

[21] Appl. No.: 10,253

[22] Filed: Feb. 8, 1979

[30] Foreign Application Priority Data

Feb. 24, 1978 [NL] Netherlands .................. 7802095

[51] Int. Cl.³ ............................................. A01D 25/04
[52] U.S. Cl. ........................................ 171/55; 171/57
[58] Field of Search ................ 171/55, 57, 58, 27, 171/28

[56] References Cited

U.S. PATENT DOCUMENTS

| 991,149 | 5/1911 | Goodfellow | 171/57 |
| 3,054,460 | 9/1962 | Steketee | 171/58 |

FOREIGN PATENT DOCUMENTS

| 532046 | 8/1931 | Fed. Rep. of Germany | 171/27 |
| 1936445 | 1/1970 | Fed. Rep. of Germany | 171/55 |
| 103635 | 1/1963 | Netherlands | 171/58 |
| 31038 | 1/1909 | Sweden | 171/58 |

Primary Examiner—Jay N. Eskovitz
Attorney, Agent, or Firm—John P. Snyder

[57] ABSTRACT

A device for digging up tuberous plants, for example beets, comprising pairs of lifting members formed by driven shafts slanting towards one another and being provided at the lower ends with lifting bodies, wherein each lifting body has a pressing face extending, viewed in an axial direction, along a helically curved line relative to the rotary axis, such, that the lifting body will gradually penetrate into the soil owing to the helical shape while the quantity of earth sticking to the beet is materially reduced and consequently the tare of the dug-up beet or tuber is considerably reduced as well as the cleaning expenses for the user.

9 Claims, 4 Drawing Figures

DEVICE FOR DIGGING UP TUBEROUS PLANTS, FOR EXAMPLE, BEETS

The invention relates to a device for digging up tuberous plants, for example beets, comprising pairs of lifting members formed by driven shafts slanting towards one another and being provided at the lower ends with lifting bodies.

As embodiment of the said lifting members is known, in which the lifting bodies are arranged like a crown along the periphery of a disc. The disc is secured to the lower end of the driven shaft and the lifting members are proportioned so that the lifting bodies repeatedly strike into the soil and laterally loosen the tuber or beet or a row from the soil and subsequently raise it from the soil. In order to enhance the probability of a lifting body hitting a beet, the known embodiments comprise a large number of such bodies. Consequently this device is expensive, When the number of lifting bodies is reduced, the number of revolutions of the disc has to be raised, which results, however, in that the lifting bodies dig too rapidly into the soil, which means an unquiet operation of the device.

The invention has for its object to improve the lifting bodies of the device described above.

The device according to the invention is distinguished in that each lifting body has a pressing face extending, viewed in an axial direction, along a helically curved line relative to the rotary axis.

This shape permits of considerably reducing the number of lifting bodies and even of limiting it to one for each rotary shaft. The lifting body will gradually penetrate into the soil owing to the helical shape so that even at a high rate of operation of the machine a quiet run is ensured. In practice it has furthermore been found that owing to this advantageous helical shape the quantity of earth sticking to the beet is also materially reduced, which is particularly important on heavy soil. This may be accounted for by the fact that the soil is jerked up rather than struck up, which occurs with the known devices. It will be obvious that the tare of the dug-up beet or tuber can thus be considerably reduced as well as the cleaning expenses for the user.

In order to avoid damage of the tuber the pressing face of the lifting body is located, viewed in a radial sense, in a plane of conical form relative to the rotary axis so that despite the inclined position of the rotary shafts, the pressing face is in a substantially vertical plane with respect to the ground. In this way a maximum contact surface with the side of the tuber is ensured.

According to the invention the lifting body is preferably formed from a curved, flat strip of material. In this way a resilient or yielding lifting body is obtained, which enhances the safe operation of the machine.

When the device is equipped with more than one pair of lifting members, the invention proposes to drive the lifting members in synchronism. This permits of causing the neighbouring lifting bodies of adjacent lifting members to mesh with one another like gear wheels, so that all pairs can be arranged in one row, which enables the use of a central driving gear of very simple structure. According to the invention the driving gear of such a machine may be constructed so that the corresponding lifting bodies of the pairs of lifting members are driven with relative time lag so that the lifting bodies become operative in order of succession, which results in a considerable reduction of the lateral reactive force on the overall device.

For heavy soils it is advantageous to provide flexible elements such as a chain or rubber strip at a certain distance above the lifting bodies, in order to ameliorate the lifting of the tubers being loosened by the lifting bodies previously The invention will be described more fully hereinafter with reference to a few embodiments.

In the drawing

Figure 2:
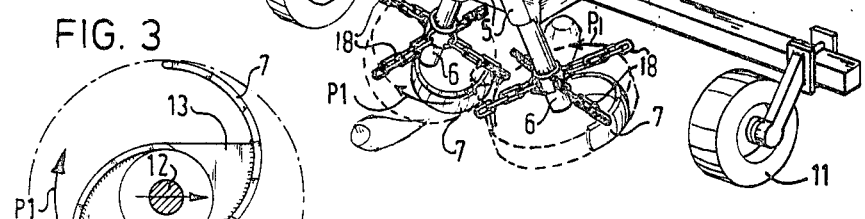
Figure 3:
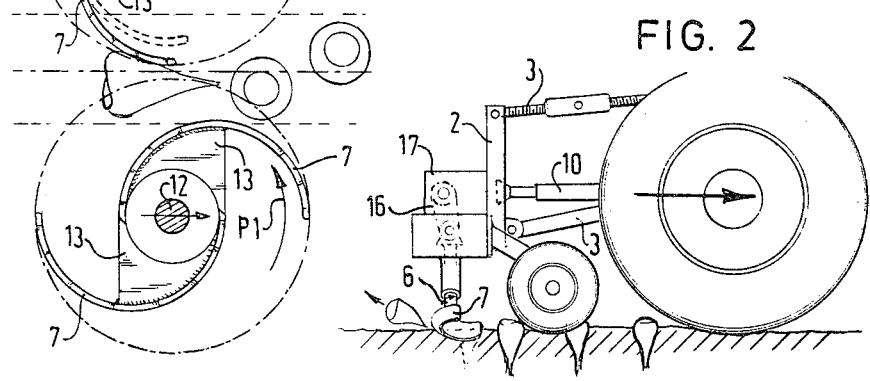
Figure 4:
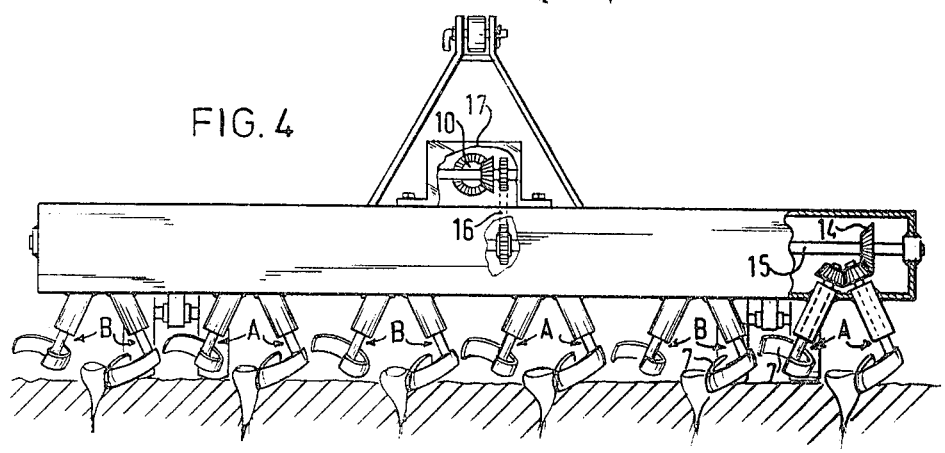

FIG. 1 is a perspective rear view of the device drawn and driven by an agricultural tractor, FIG. 2 is a side elevation of the device of FIG. 1, FIG. 3 is a plan view of a pair of lifting members of a further embodiment differing from that of FIGS. 1 and 2 in an axial sense, FIG. 4 illustrates a device comprising a number of pairs of lifting members arranged in one row.

The device comprises a frame beam 1 provided with a hitch 2 for attachment to the three-point lift 3 of the agricultural tractor. To the frame beam 1 is welded a U-shaped frame portion 4 provided with two bearing bushings 5 arranged at an angle to one another. Each bearing bushing 5 accomodates a shaft 6, to the lower end of which are secured the lifting bodies 7 embodying the invention. The shafts 6 are provided at the top ends with a bevel pinion. Said pinions are intermeshing and one of the shafts 6 is driven by means of a universal shaft 8 via a transmission gear 9 by the power take-off shaft 10 of the agricultural tractor. It will be obvious that the pinion connection between the two shafts 6 ensures synchronous operation of the lifting bodies 7 as soon as the power take-off shaft 10 is rotated.

For the sake of completeness it is noted that the frame beam 1 is provided on either side with ground-engaging wheels 11, which may be adjustable in a direction of height so that the depth of penetration of the lifting bodies into the soil can be adjusted.

The lifting body 7 according to the invention has a pressing face i.e. the external, spherical face of the lifting bodies shown in the figures, said face being helically curved, viewed on plan (see FIG. 3) or in an axial direction, with respect to the rotary shaft 6. The orientation of the lifting bodies 7 with respect to the direction of rotation (arrow P1 in the figures) is such that the pressing face of the lifting bodies 7 is in a trailing position. Moreover, the disposition of the lifting bodies 7 of a pair of lifting members is such that each time only one lifting body 7 is operative, which means that the beet or tuber is subjected either on the left-hand side or on the right-hand side to a pressing force which jerks the same before it is finally pushed out of the soil.

The lifting body 7 is preferably made from a strip of material, only one end of which is secured to the lower end of the driving shaft 6 (see FIG. 1). FIG. 3 shows an embodiment in which the lifting bodies 7 are secured to a hub 12, whilst in addition stiffening or reinforcing plates 13 are arranged between the hub and the inner side of the lifting bodies 7.

The numeral 18 indicates flexible elements mounted on the rotary shaft 6 at a certain distance above the lifting bodies. Said flexible elements, shown as chains in FIG. 1, contribute to the working of the lifting bodies.

FIG. 4 shows a device in which six pairs of lifting members are arranged in side-by-side alignment. From the figure it will be apparent that every lifting body A and every lifting body B of neighbouring lifting members can be disposed in close proximity of one another, since the operative portion of the lifting body 7 reaches into the free space of the field of rotation of the neighbouring lifting body. Thus the overall width of the machine can be restricted or the lifting bodies can be aligned without hindering one another. Furthermore, the central drive is materially simplified, since every pair of bevel pinions is driven by a third bevel pinion 14 on a central longitudinal shaft 15. The longitudinal shaft 15 may be rotated through a chain transmission 16 and a gear box 17 by the power take-off shaft 10, for example, of the agricultural tractor.

This driving mechanism ensures the synchronous operation of all pairs of lifting members, whilst it is simply possible to drive every lifting member A and every lifting member B with relative time-lag that is to say by shifting every bevel pinion by one tooth with respect to the other, In this way the lifting bodies A and B become operative in order of succession from left to right or from right to left, so that the lateral reactive force on the suspension gear is reduced.

What is claimed is:

1. Apparatus for digging up tuberous crops such as beets, comprising in combination:
   frame means adapted to be moved over the ground surface;
   a pair of shafts depending from said frame means in mutually diverging relation to each other transversely of the direction of movement of the frame means;
   drive means for rotating said shafts;
   each shaft terminating in a lower end portion adapted to move over the ground surface in closely spaced relation thereabove, the lower end portions of said shafts being laterally spaced apart relative to the direction of movement of the apparatus and each shaft defining an axis which is inclined, with respect to the vertical, laterally inwardly toward the other shaft; and
   a pair of digger blades one at the lower end of one shaft and the other at the lower end of the other shaft, each digger blade having a leading end fixed to the lower end portion of its associated shaft and extending therefrom in a direction opposite to the direction of rotation of the shaft and in outwardly spiralling and helical relation to the axis of such shaft to terminate in a trailing end spaced below its respective shaft by an amount such that said trailing end follows a circular path centered on the axis of its shaft and perpendicular thereto with a portion only of such path lying below the ground surface, each blade presenting outer and inner surfaces extending between said leading and trailing ends thereof of widths sufficient respectively to displace soil laterally toward the other blade and to lift soil upwardly in response to rotation of the associated shaft while such blade is penetrated into the ground.

2. Apparatus as defined in claim 1 wherein said outer surface of each blade lies in a conical plane.

3. Apparatus as defined in claim 1 or 2 wherein the trailing ends of said blades are rotationally staggered with respect to each other.

4. Apparatus as defined in claim 1 or 2 wherein said shafts are synchronously driven in relatively opposite directions of rotation, the trailing ends of said blade being rotationally staggered with respect to each other.

5. Apparatus as defined in claim 1 or 2 including at least one further pair of shafts and respective blade members similar to the shafts and blade members first mentioned, all of said shaft being in transverse alignment and being driven simultaneously by said drive means.

6. Apparatus as defined in claim 1 or 2 including at least one flexible element fixed to the lower portion of each shaft above a respective blade.

7. Apparatus as defined in claim 5 including at least one flexible element fixed to the lower portion of each shaft above a respective blade.

8. Apparatus as defined in claim 5 wherein the trailing ends of said blades are rotationally staggered with respect to each other.

9. Apparatus as defined in claim 5 wherein said shafts are synchronously driven in relatively opposite directions of rotation, the trailing ends of said blade being rotationally staggered with respect to each other.

* * * * *